No. 785,420. PATENTED MAR. 21, 1905.
J. J. GRIGSBY.
AIR BRAKE COUPLING.
APPLICATION FILED JULY 25, 1904.
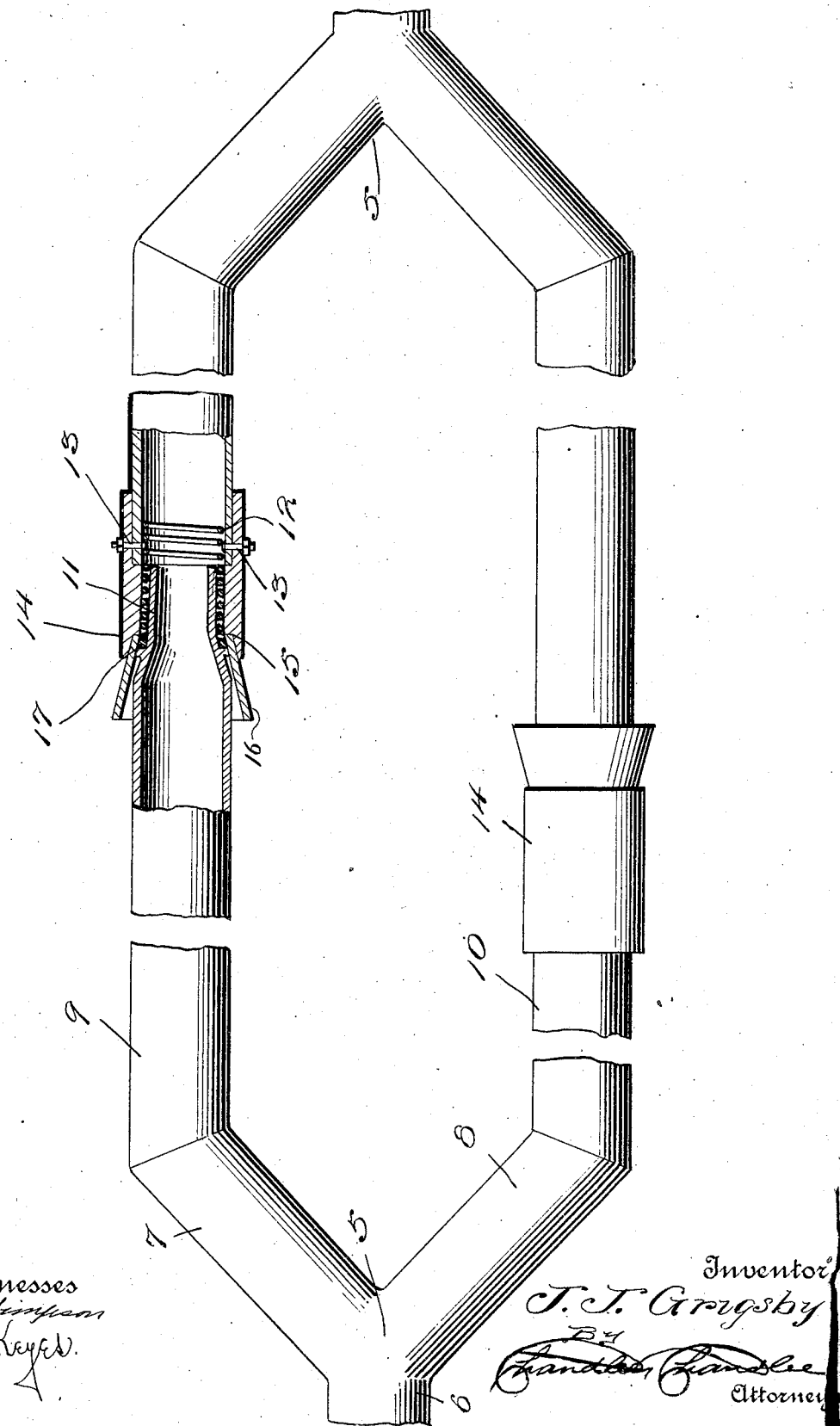

No. 785,420. Patented March 21, 1905.

UNITED STATES PATENT OFFICE.

JESSE J. GRIGSBY, OF MILROY, INDIANA.

AIR-BRAKE COUPLING.

SPECIFICATION forming part of Letters Patent No. 785,420, dated March 21, 1905.

Application filed July 25, 1904. Serial No. 218,072.

*To all whom it may concern:*

Be it known that I, JESSE J. GRIGSBY, a citizen of the United States, residing at Milroy, in the county of Rush, State of Indiana, have invented certain new and useful Improvements in Air-Brake Couplings; and I do hereby declare the following to be a full, clear, and exact description of the invention, such as will enable others skilled in the art to which it appertains to make and use the same.

This invention relates to pipe-couplings, and more particularly to those for joining the air-brake pipes on railroad-cars, and has for its object to provide a device of this nature which will automatically operate when the cars are coupled and which will prevent the leakage of air.

A further object is to provide means for relieving the strain upon the parts when the coupling operation is performed.

In the drawing forming a portion of this specification, and in which numerals of reference indicate the parts, there is shown a top plan view of the coupler, partly in section.

The present coupler consists of two members which are identical, so that a description of one will suffice for both.

Referring now to the drawing, each member 5 of the present invention comprises a pipe 6, which is connected to the pipe-line of the car and which has diverging pipes 7 and 8 extending from its outer end. Secured to the ends of the pipes 7 and 8 are other pipes, 9 and 10, which lie parallel to each other, the pipe 9 being somewhat longer than the pipe 10 and having a tapered portion 11 at its free end.

Disposed within the free end of the pipe 10 and projecting therebeyond is a helical spring 12, which is secured in position by means of bolts 13, which are passed through the sides of the pipe and lie between the helices of the spring.

Inclosing the spring 12 and the end of the pipe 10 is a rubber sleeve 14, and secured to the outer end of the spring and projecting beyond the sleeve is the minor end 15 of a funnel 16, which is arranged for the reception of the reduced portion 11 of the pipe 9 of the opposite member to convey this portion to the spring, the reduced portion being of a size to fit snugly therewithin.

The pipe 9 is provided with a resilient encircling washer 17, which fits within the minor end 15 of the funnel, thus preventing the leakage of air.

In mounting the members upon cars they are disposed so that the pipe 9 of one car fits into the pipe 10 of the other, and it will be understood that when the cars are coupled the impact will be taken up by the springs 12, thus relieving the parts of strain.

In practice modifications of the specific construction shown may be made and any desired materials may be used without departing from the spirit of the invention.

What is claimed is—

A pipe-coupling comprising a tubular section, a helical spring secured within and projecting beyond the end of the tubular section, a funnel secured at its minor end to the outer end of the spring, a resilient sleeve surrounding the spring, a second tubular section arranged for insertion within the spring and of a size to fit snugly therewithin, and a resilient washer surrounding the second tubular section and arranged to fit snugly within the funnel.

In testimony whereof I affix my signature in presence of two witnesses.

JESSE J. GRIGSBY.

Witnesses:
    W. W. INNIS,
    BEN. F. RICHE.